Dec. 24, 1968 A. L. GARNERO 3,418,403
METHOD OF FABRICATING PANELS OF EXPANDED PERLITE
Filed Feb. 21, 1966 2 Sheets-Sheet 1

INVENTOR
Anthony L. Garnero
by McDougall Hersh
Scott and Ladd
Attys

Dec. 24, 1968   A. L. GARNERO   3,418,403
METHOD OF FABRICATING PANELS OF EXPANDED PERLITE
Filed Feb. 21, 1966   2 Sheets-Sheet 2

Fibers

INVENTOR
Anthony L. Garnero
by McDougall Hersh,
Scott and Ladd
Attys

United States Patent Office 3,418,403
Patented Dec. 24, 1968

3,418,403
METHOD OF FABRICATING PANELS OF
EXPANDED PERLITE
Anthony L. Garnero, Wheaton, Ill., assignor, by mesne assignments, to Central Manufacturing District, Chicago, Ill., a trust of Massachusetts
Continuation-in-part of application Ser. No. 381,145, July 8, 1964. This application Feb. 21, 1966, Ser. No. 528,972
10 Claims. (Cl. 264—91)

ABSTRACT OF THE DISCLOSURE

A method of producing panels of self bonded expanded perlite particles in which perlite particles are introduced into a heated zone with angularly directed flames through which the particles pass, are heated and expanded to a pyroplastic and adhesive state. Rapid deposition of the expanded particles onto a moving foraminous belt permits the particles to adhere in a manner to form a unified coherent layer which is then formed into the desired panels.

---

This in a continuation-in-part of my copending application Ser. No. 381,145, filed July 8, 1964, entitled "Structural Material of Expanded Minerals and Method for Manufacture," and now abandoned.

This invention relates to a method of preparing insulation panels fabricated of expanded perlite particles and more particularly to the method for the manufacture of a highly porous thermal insulation product of expanded perlite and to tiles of relatively high strength and good dimensional stability formed thereof.

It is an object of this invention to produce and to provide a method for producing a thermal insulation product of expanded perlite.

More particularly, it is an object of this invention to produce and to provide a method for producing thermal insulation of expanded perlite particles formed as an incidence to expansion by thermal reaction of the perlite.

These and other objects and advantages of this invention will hereinafter appear and for purposes of illustration, but not of limitation, an embodiment of the invention is shown in the accompanying drawings, in which.

Figure 1:
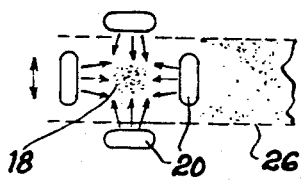
FIG. 1 is a schematic view taken along the line 1—1 of FIG. 3.

Insulation products have heretofore been fabricated of expanded perlite but, to the best of applicant's knowledge, such insulation products have been manufactured of perlite which has been expanded separate and apart from the fabrication of the composite insulation structure. The expanded mineral has been used either in particulate form for free flow to fill the space to be insulated or else use has been made of the combination of the expanded perlite with an external binder to form the perlite into molded or composite insulation products.

To the present, perlite has been expanded by the passage of the perlite in finely divided form through a furnace which is maintained at elevated temperature. The intent of the expansion of perlite has been to produce separate expanded perlite particles which could be used as a filler for insulation. Thus it was desirable to minimize contact between the particles of perlite during the period of expansion to avoid clinker formation. Any agglomeration to form clinkers was looked upon as undesirable in the expansion process and any clinkers that were formed were discarded as waste material. Thus the objective was to minimize clinker formation since clinkers constitute waste of material and such clinkers interfered with the expansion process since it was necessary periodically to interrupt the process to enable removal of the clinkers from the path of travel of the particles through the furnace.

In accordance with the practice of this invention, the expansion of perlite is carried out under conditions wherein interfusion without additional binder between the perlite particles is achieved concurrently with the expansion of the perlite while the perlite is in its initial pyroplastic state with the specific intention of producing a composite, interbonded structure of expanded perlite particles having good thermal insulation characteristics and strength properties sufficient to enable use of the composite as an insulation panel or board from which tiles or other insulation products may be formed.

By the control of the speed of the perlite particles, the manner of application of heat to the perlite particles, and the collection of the expanded perlite particles while in the pyroplastic state, it has become possible to produce insulation products without further processing. It is preferred however, to employ a compression step in combination with the expansion and agglomeration of the perlite particles to compact the expanded particles and to provide for a controlled volume relationship thereby to enhance the strength of the composite insulation product that is formed. By the combination which makes use of a compacting step or steps in combination with the concurrent expansion and agglomeration, it is possible to produce composite products having a density which may vary from 1 pound per cubic foot to as much as 80 pounds per cubic foot, while still maintaining porosity and mass integrity sufficient to enable use as a structural insulation material.

Referring now to perlite as an ingredient, it has been found that the desired expansion and agglomeration of the particles for the fabrication of a porous insulation structure can be achieved while the perlite particles are in a pyroplastic state, as distinguished from a fluid state above pyroplastic temperature, or a non-deformable state below pyroplastic temperature. In this connection, it will be understood that the critical temperature conditions employed in the practice of this invention will vary somewhat with various types and grades of perlite. By way of illustration, using a common brand of perlite, it appears that the perlite particles enter the pyroplastic stage and are reacted simultaneously to release combined water for expansion when substantially instantaneously heated to a temperature above 1800° F. Expansion at a maximum rate or to a maximum amount is preferably achieved when the particles of perlite are heated substantially instantaneously to higher temperatures within the range of 1600–2200° F. As much as 800 percent expansion can be achieved when the perlite particles are heated to a temperature of 1600° F. within a time ranging from a fraction of a second to a few seconds or when heated to a temperature of 2200° F. for even shorter periods of time. Temperatures in excess of 2200° F. can be employed with corresponding reductions in time of exposure but it is undesirable to heat the particles to a temperature in excess of 2400–2500° F. for any length of time because perlite is reduced to a fluid state at such temperatures which enables collapse of the expanded perlite particles in the composite mass. When heated to 2400° F. or higher, the perlite also tends to form into a glassy or a vitrified phase which reduces the porosity of the product and which also markedly increases the brittleness thereof thereby to impair its installation characteristics and strength. As a result, while the perlite particles can be heated to a temperature in excess of 2500° F., the time factor becomes important because otherwise a reduction in volume will occur and an embrittled and weaker product will be secured. Best results are secured, from the standpoint of expansion, when the perlite particles are heated substantially instantaneously to a temperature of 1900–2200° F. since the adhesiveness developed appears to be at a maximum at this temperature range.

The pyroplastic state, necessary for adhesion, occurs with the average perlite at a temperature within the range of 2000–2200° F. It has been found, however, that the combined water which is released as a vapor when the perlite particles are heated to the described elevated temperature range operates as a flux which enables the desired stickiness to develop for agglomeration of the perlite particles when the perlite is heated to a temperature as low as 1400° F. but preferably to a temperature above 1600° F. Thus, agglomeration can be achieved at temperatures starting at 1400° F. Best adhesions and expansions, for use in the practice of this invention, are secured when the particles of perlite are heated to a temperature above 1800° F. Thus the preferred conditions for operation from the standpoint of combined expansion and agglomeration reside in the rapid heating of the perlite particles to a temperature within the range of 1800–2200° F.

When the perlite particles are individually expanded in the process heretofore employed, separate and apart from agglomeration, the vapor necessary for fluxing the perlite is not available for subsequent agglomeration so that it becomes necessary to heat the expanded perlite particles to a temperature in excess of 2400° F. for reduction to the adhesive stage for coalescence. Since such temperatures are close to the temperature of the glassy phase and collapse, and since much greater time is required for aggloneration of the previously expanded perlite, it is difficult to form a composite structure of perlite particles from which the combined water has previously been removed by heating or drying. Thus it becomes practically impossible to form such composite porous insulation products of previously expanded perlite particles. It is for this reason that the art has had to turn to the use of external binder in combination with the expanded perlite particles for the manufacture of porous insulation products.

The time and temperature conditions employed in the practice of this invention can best be achieved by exposure of the perlite particles directly to a flame or flames for a period of time achieved by the passage of the particles rapidly through the flame for exposure of the particles to the heat of the flame for a fraction of a second up to perhaps 1 to 2 seconds. In practice the finely divided particles of perlite can be allowed to fall gravitationally to the flame whereafter the downwardly directed flames accelerate downward movement of the particles rapidly through the flames for projection onto the collecting surface for agglomeration by interfusion. The same characteristics are incapable of being achieved when the particles of perlite are allowed to fall gravitationally through a heated zone of the type provided by radiant heaters or from external heaters or burners. When the particles of perlite are exposed to other than direct flame heat, the desired degree of expansion and interfusion is incapable of being effected perhaps because of a heat transfer rate insufficient to reduce the perlite particles sufficiently rapidly to the pyroplastic state before loss of combined water.

The size of the particles of perlite is not critical although it will be understood that the larger the particles, the more time that will be required to heat the mass to the desired temperatures. In the practice of this invention, it is preferred to make use of perlite particles having a mesh size less than 20 and sometimes less than 100. When larger particles are employed, breakdown of the particles to a number of particles of smaller size will usually occur in response to the release of combined water.

Referring now to the drawings, the furnace employed in the practice of this invention comprises a housing 10 having a hopper 12 in the upper portion provided with a feed opening 14 having a dispenser 16 operating therein for displacement of a stream 18 of perlite particles therethrough. The stream 18 of perlite particles falls gravitationally through a ring of gas burners 20 surrounding the stream 18 and arranged to direct their flames 22 angularly downwardly into the stream 18 whereby the perlite particles are exposed to the direct heat of the flame and whereby the rate of travel of the particles downwardly is accelerated by the flame for passage downwardly through the housing onto a collecting surface 26.

Figure 2:
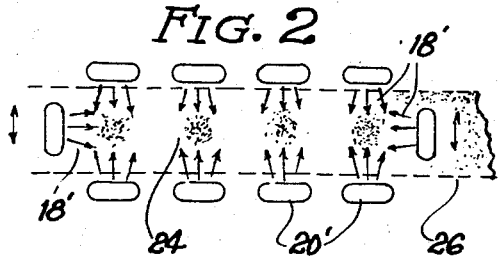
FIG. 2 is a view similar to that of FIG. 1 showing a modification in burner arrangement.
Figure 3:
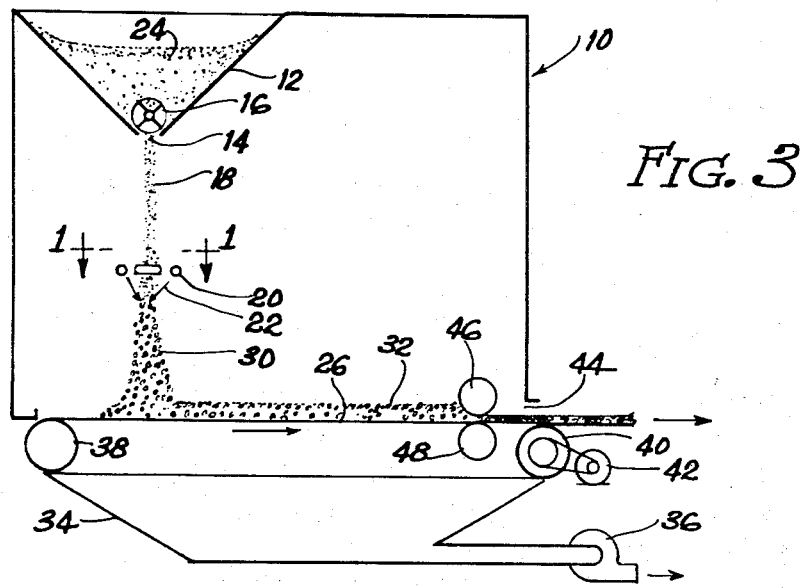
FIG. 3 is a schematic elevational view of a modification in a furnace which may be employed in the practice of this invention.

In the modification shown in FIG. 2, the perlite particles 24 are released in a plurality of crosswise aligned or lengthwise aligned streams 18' or combination of crosswise and lengthwise aligned streams 18' surrounded with burners 20'. Instead of allowing the perlite particles to fall gravitationally from the feed outlet, they can be projected from the feed at relatively high speed for reducing the time of exposure to the direct flame.

An elongate endless foraminous belt 26, spaced a short distance below the burners 20, defines the bottom wall of the housing onto which the expanded perlite particles 30 in their pyroplastic state are projected to form a composite panel 32 of interfused expanded perlite. The underside of the foraminous belt communicates with a vacuum chamber 34 provided with a suction from an exhaust fan 36 whereby a suction desirable for the collection and agglomeration of the expanded perlite particles is drawn on the underside of the belt.

The belt is in the form of a thermally stable, flexible member which operates about sprockets 38 and 40, one of which is a driven sprocket connected to a driving motor 42 for movement of the top flight of the belt in one direction across the housing through an opening 44 in one side of the housing.

A compacting roller 46 is mounted within or without the furnace with a predetermined spaced relationship with the top of the belt 26 and means are provided for varying the spaced relationship between the roller and belt so as to provide for a controlled amount of compacting of the formed layer 32. It is also preferred to make use of a backup roller 48 beneath the belt in cooperative relationship with the compacting roller 46 to support the belt for compacting the expanded perlite particles in between. Instead of a backing roll, use can be made of a stationary backing plate to support the belt beneath. The thickness of the layer of agglomerated expanded perlite particles collected on the surface of the belt 26 can be varied depending upon the rate of introduction of the perlite particles into the furnace or by the linear rate of travel of the collecting belt. The compacting roller 46 can be located immediately beyond the furnace wall for engagement with the layer while the perlite particles are still in their pyroplastic stage for interfusion. It is preferred to maintain the compacting roll in a cooled state as by water cooling, air cooling, and the like.

Figure 4:
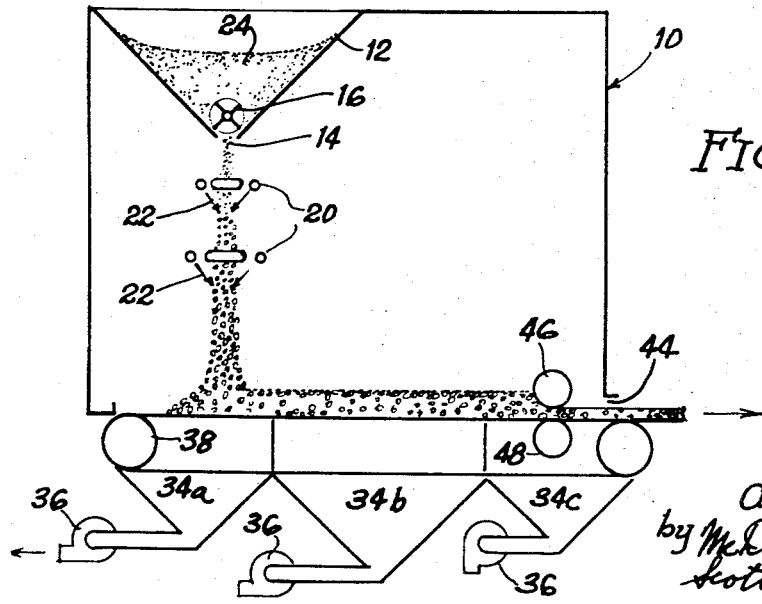
FIG. 4 is an elevational view similar to that of FIG. 3, showing a modification in a furnace structure.
Figure 5:
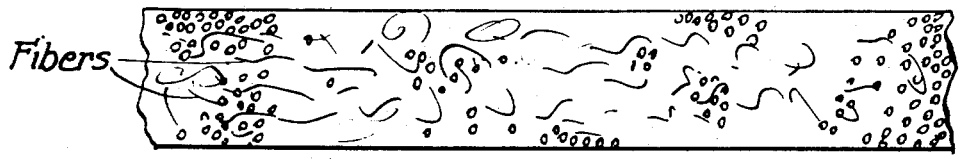
FIG. 5 is a cross-sectional view of a fragmentary portion of a porous structure of expanded perlite prepared in accordance with the practice of this invention.
Figure 6:
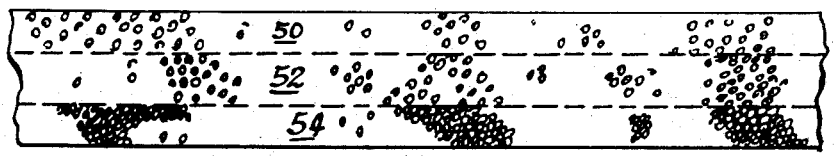
FIG. 6 is a cross-sectional view showing a modification in the porous insulation panel which may be formed by this invention.

The flame burners 20 are preferably arranged to surround the path of travel of the perlite particles through the furnace with the flame issuing from the burner outlets being angled in the direction of travel of the perlite particles through the furnace so that the force of the flame will accelerate the rapid projection of the particles at a high rate through the flame section of the furnace and onto the collecting belt for positive engagement between the particles while in their pyroplastic state for agglomeration by interfusion. For this purpose, the burners can be arranged circumferentially about the path of the perlite particles, as illustrated in FIGS. 1 and 2, and preferably with means for oscillating the burners crosswise of the furnace or lengthwise of the furnace to sweep across the path of travel of the particles for more complete coverage of the particles. The burners can be arranged in tiers about the path of travel of the perlite particles, as illustrated in FIG. 4, for increasing the length of the path of travel of the perlite particles through the flame section and for extending the engagement of the particles for continued projection through the furnace onto the collecting belt 26.

In the event that it is desirable to impart velocity to the perlite particles at the time that they are introduced into the furnace and the area wherein the particles are engaged by the flame from the burners, the particles of perlite are introduced from a plurality of nozzles with velocity being supplied by air under pressure or by auxiliary flames in which the perlite particles are entrained for projection at high speed into the furnace. The air with which the particles are entrained for transport into and through the furnace is preferably preheated to an elevated temperature. It is preferred, however, to control and to impart the desired velocity by the impinging flame or flames and, for this purpose, it is preferred to make use of a greater number of small flames rather than a few large flames.

Under the foregoing circumstances of blowing the particles at high velocity into the furnace and continued projection of the particles by the gas burning flame through the furnace, the path of travel of the particles into and through the furnace and onto the foraminous collecting belt need not be limited to the downward direction. Sufficient velocity can be achieved by lateral travel of the particles through the furnace for collection onto a vertically disposed foraminous belt or by travel in other directions through the furnace. The collecting belt is spaced a short distance below the flame section with the spacing calculated to engage the particles on the belt surface while the particles are in the expanding pyroplastic state. Such spacing, therefore, can be varied depending upon the velocity imparted to the particles and the time of exposure to the flames.

Suction on the underside of the foraminous belt adds materially to the ability to hold the expanded particles of perlite in the mass for agglomeration and in the construction of a composite panel of high strength and mass integrity. In the absence of suction on the underside of the belt and in the light of the high velocity at which the expanded perlite particles are projected onto the surface of the belt, splattering of the particles would occur with corresponding crustations formed on the walls of the furnace and with corresponding disturbance with the collection of expanded particles in the desired arrangement on the belt. In providing the desired suction on the underside of the belt, use can be made of a vacuum chamber 34 common to the length of the belt within the furnace or the vacuum can be subdivided into separate vacuum chambers 34ᵃ, 34ᵇ, 34ᶜ and the like arranged lengthwise of the belt and dimensioned to extend crosswise thereof for purposes of adjusting the amount of suction applicable to lengthwise portions of the collecting belt.

The concepts of this invention include the addition of inorganic materials in dry powder form, for admixture with the finely divided particles of perlite projected through the path of the flame thereby to provide a material which enhances interfusion between the surfaces of the perlite particles. The materials are selected to be reduced to an adhesive state or which react with the perlite to be reduced to a glassy pyroplastic stage at a temperature within the pyroplastic range of the perlite particles and preferably below such temperatures so as to function as an inorganic adhesive which operates preferably in combination with the adhesiveness of the perlite particles firmly to bond the expanded particles together. For this purpose, use can be made of materials which have a lower fusion range than perlite and such materials may be represented by sodium silicate, borates, borax, magnesia, calcium hydroxide, and the like low melting point glasses or metal salts. Use can also be made of materials having a higher fusion point but which react, preferably with the perlite particles, to impart interfusion at a temperature within the pyroplastic stage. Improvement in the bonding relation with resultant increase in strength properties of the composite mass is secured when such material is embodied with the perlite particles in an amount greater than 0.1 percent by weight of the perlite but less than 10 percent by weight of the perlite. It is preferred to make use of an amount within the range of 0.5 to 2.0 percent by weight of the perlite since such amounts will add materially to the adhesiveness without undesirably affecting the porosity or the specific gravity of the formed structure. The eutectic type material in dry powder form can be admixed with the perlite particles in advance of heating to provide for a relatively uniform distribution of the eutectic adhesive particles over the surface of the perlite.

The strength properties of the composite mass of expanded perlite can be increased by the combination to include fibers of glass or of other inorganic or ceramic materials as a component in combination with the perlite particles which are subjected to the thermal expansion step. It is preferred to make use of glass fibers because of the high strength characteristics of such fibers and because of their relative inertness from the standpoint of chemical, weather and heat resistance. Other fibers can be employed but it is essential to limit the use to inorganic fibers which are capable of retaining their fibrous characteristics and strengths at the temperature conditions to which the fibers are subjected for expansion of the perlite. Included also will be fibers formed of metal.

Most high strength glass or other siliceous fibers are capable of retaining their fibrous characteristics for the short period of time to which they are exposed and at the temperature conditions existing. When, however, the ordinary high sodium glasses cannot be employed as a reinforcement for the composite formed of the expanded perlite, use can be made of fibers or higher melting point glasses such as the high silica glasses or quartz glasses as represented by glasses of the following compositions which have a melting point above 2000° F.:

EXAMPLE 1

| | Percent by weight |
|---|---|
| Silica | 87.5 |
| Titanium dioxide | 11.5 |
| Calcium oxide | 1.0 |

EXAMPLE 2

| | Percent by weight |
|---|---|
| Silica | 86.0 |
| Sodium oxide | 7.5 |
| Beryllium oxide | 6.5 |

EXAMPLE 3

| | Percent by weight |
|---|---|
| Silica | 87.0 |
| Aluminum oxide ($Al_2O_3$) | 8.0 |
| Iron oxide ($Fe_2O_3$) | 2.0 |
| Magnesium oxide (MgO) | 1.0 |
| Potassium or sodium oxide | 2.0 |

For reinforcement, siliceous fibers in the amounts ranging from 0.5 to 10.0 percent by weight may be incorporated. When more than 5 percent by weight is introduced, difficulties will be encountered in feeding the material through the furnace. In addition to reinforcement markedly to increase the strength properties of the composite of expanded perlite, it has been found that the presence of glass and the like fibers in the amounts described will operate unexpectedly to impart a flexibility to the ordinary rigid and relatively brittle composite formed of perlite which is expanded and agglomerated in accordance with the practice of this invention.

The high strength properties of glass fibers exist chiefly in tension whereas the composite of expanded perlite which is formed in accordance with the practice of this invention has been found to have good compressive strengths and relatively poor tensile strengths. Thus the combination of glass fibers and expanded perlite operates to produce a product having good physical and mechanical properties without loss of other desirable characteristics of the insulation.

Similarly, colored metal oxides and salts in powder or other finely divided form can be introduced with the perlite particles to provide a color in the final product. For this purpose, use can be made of cobalt oxide, lead oxide, iron oxide, molybdenum oxide, copper oxide and the like colored metal oxide or colored salts of cobalt, copper, molybdenum and the like. The metal oxides or salts can be varied in amounts depending upon the color intensity desired in the final product but it is undesirable to dilute the perlite by the use of the metal oxide or salt in amounts greater than 5 percent by weight of the perlite.

By way of still further modification, a panel having improved insulation characteristics can be prepared in accordance with the practice of this invention by the formation of the panel with contiguous layers of expanded perlite compacted to variable densities such as to produce a panel having a low density at one side with increasing densities from the one side to the other or with a low density material in the outer walls with a core of high density material in between or vice versa. For this purpose, use can be made of a series of compacting rollers with areas in between for the deposition of agglomerating particles of expanded perlite and in which the thickness of the layer deposited and the amount of compacting effected is controlled to give the layer the desired density characteristics. Instead, use can be made of perlite ores of different compositions introduced at separate longitudinally spaced inlets crosswise of the furnace to provide layers of the desired variation in density.

In the drawings, illustration is made of a construction wherein an outer layer 50 is formed of low density with an intermediate layer 52 of intermediate density and the layer 54 at the opposite side of highest density. Instead, the outer layers may correspond to the layer 50 of low density with the intermediate layer 52 being of the higher density characterized by the layers 52 or 54 of the illustration.

Similar results are incapable of being secured with particles of clay or the like materials since the characteristics of expansion with concurrent interfusion between the expanded perlite particles depends upon the existence of the perlite in a glassy phase while in the pyroplastic stage. Clay and the like alumino silicates are incapable of formation into a glassy phase upon fusion whereby the same type of expansion and interfusion is incapable of being achieved. The addition of clay as an ingredient in combination with the perlite is desirable since clay operates in the expanded perlite product to stiffen and toughen the perlite and product formed thereof. For this purpose it is desirable to make use of substantially pure kaolin.

It will be further understood that changes may be made in the details of materials, construction and operation without departing from the spirit of the invention, especially as defined in the following claims.

I claim:

1. In the method of fabrication of a porous insulation layer of expanded perlite particles interbonded by interfusion, the steps of supplying unexpanded perlite particles in finely divided form and in which the perlite still contains combined water, introducing the finely divided perlite particles for passage downwardly in linear movement as separated and unsupported perlite particles through a heating zone, engaging the unsupported and separated perlite particles with the direct flame of burners during passage through the heating zone to heat the perlite particles to the pyroplastic stage during passage through the heating zone whereby the perlite particles expand in response to the vaporization of combined water and are concurrently reduced to an adhesive stage, directing the flame from the burners onto the pathway of the perlite particles at an angle in the direction of movement of the perlite particles through the heating zone to accelerate movement of the perlite particles through the heating zone and onto a collecting wall, positioning a foraminous collecting wall horizontally across the downward path of travel of the perlite particles closely beyond the heating zone whereby the perlite particles are projected on the foraminous wall while in their expanded and adhesive stage for interfusion of the expanded perlite particles to form an agglomerated layer of expanded perlite particles thereon, moving the wall substantially continuously in one direction for removal of the agglomerated layer of expanded perlite particles from the path of travel, and communicating the opposite side of the foraminous collecting wall with vacuum whereby expanded perlite particles are drawn onto and held on the collecting wall.

2. The method as claimed in claim 1 in which the perlite particles are passed into the heating zone from a number of spaced outlets.

3. The method as claimed in claim 1 in which the burners in the heating zone are arranged about the path of travel of the perlite particles through the heating zone.

4. The method as claimed in claim 3 which includes the step of oscillating the burners for more complete coverage of the perlite particles.

5. The method as claimed in claim 1 which includes the step of adding a siliceous, inorganic eutectic material in finely divided form in admixture with the perlite particles prior to projection through the heating zone in which the eutectic material forms an adhesive stage at a temperature within the pyroplastic stage of the perlite.

6. The method as claimed in claim 5 in which the amount of eutectic material admixed with the perlite particles comprises more than 0.1 but less than 5.0 percent by weight of the perlite.

7. The method as claimed in claim 1 which includes the step of compacting the layer of expanded perlite particles agglomerated on the surface of the collecting wall.

8. The method as claimed in claim 7 in which the perlite particles are compacted to a different degree through the cross-section of the composite layer to produce a product of agglomerated expanded perlite having densities which vary in cross-section.

9. The method as claimed in claim 1 which includes admixing a small amount of finely divided clay particles with the perlite for stiffening and toughening the perlite.

10. The method as claimed in claim 9 in which the clay particles are present in an amount within the range of 1 to 10 percent by weight of the perlite.

References Cited

UNITED STATES PATENTS

| | | | |
|---|---|---|---|
| 1,877,136 | 9/1932 | Lee | 264—145 X |
| 2,521,190 | 9/1950 | Stafford et al. | 106—122 X |
| 2,544,019 | 3/1951 | Hertiage | 264—121 |
| 2,625,512 | 1/1953 | Powell. | |
| 3,025,202 | 3/1962 | Morgan et al. | 264—121 X |

ROBERT F. WHITE, *Primary Examiner.*

J. R. HALL, *Assistant Examiner.*

U.S. Cl. X.R.

106—122; 252—378; 264—121